United States Patent
Garrett

(10) Patent No.: US 9,556,499 B2
(45) Date of Patent: Jan. 31, 2017

(54) DEEP LASER PEENING

(71) Applicant: Ellwood National Investment Corp., Wilmington, DE (US)

(72) Inventor: Roger L. Garrett, New Wilmington, PA (US)

(73) Assignee: Ellwood National Investment Corp., Wilmington, DE (US)

( * ) Notice: Subject to any disclaimer, the term of this patent is extended or adjusted under 35 U.S.C. 154(b) by 993 days.

(21) Appl. No.: 13/833,145

(22) Filed: Mar. 15, 2013

(65) Prior Publication Data

US 2016/0356306 A1 Dec. 8, 2016

(51) Int. Cl.
*C21D 10/00* (2006.01)
*B23K 26/00* (2014.01)

(52) U.S. Cl.
CPC ......... *C21D 10/005* (2013.01); *B23K 26/0069* (2013.01)

(58) Field of Classification Search
None
See application file for complete search history.

(56) References Cited

U.S. PATENT DOCUMENTS

| | | | |
|---|---|---|---|
| 5,525,429 A | 6/1996 | Mannava et al. | |
| 6,648,995 B2* | 11/2003 | Minemura | C21D 1/10 148/571 |
| 9,015,939 B2* | 4/2015 | Reeb | B21H 7/185 29/402.06 |
| 2003/0071614 A1* | 4/2003 | Buttle | G01N 3/32 324/209 |
| 2004/0108306 A1 | 6/2004 | Wiezbowski et al. | |
| 2010/0300168 A1* | 12/2010 | Ishikura | B24C 1/086 72/53 |
| 2010/0308612 A1 | 12/2010 | Antunes et al. | |

FOREIGN PATENT DOCUMENTS

| EP | 0924306 A2 | 6/1999 |
|---|---|---|
| JP | 2007246975 A | 9/2007 |

OTHER PUBLICATIONS

International Searching Authority (EPO), Search Report for International Application PCT/US2014/024087, Aug. 5, 2014, 4 pages, The Hague, Netherlands.
Brockman et al., "Prediction and characterization of residual stresses from laser shock peening", International Journal of Fatigue, Aug. 18, 2011, pp. 96-108, vol. 36, No. 1, Butterworth Scientific LTD, Guilford, GB.

* cited by examiner

*Primary Examiner* — Samuel M Heinrich
(74) *Attorney, Agent, or Firm* — Ference & Associates LLC

(57) ABSTRACT

An embodiment includes a method, comprising: applying an overlay material to a portion of a rotatable shaft; directing a pulse of laser energy to contact the overlay material to produce a shock wave; and re-positioning one or more of the portion of the rotatable shaft and the pulse of laser energy to contact the overlay material at different positions to create a laser peened surface on the portion of the rotatable shaft; the pulse of laser energy comprising a pulse sufficient to create the laser peened surface having residual compressive stress to a depth exceeding about 3 mm. Other aspects are described and claimed.

14 Claims, 4 Drawing Sheets

DEEP LASER PEENING

BACKGROUND

Peening is a surface treatment or process that creates residual compressive stresses in component surfaces. Conventional techniques include (but are not limited to) shot peening, pneumatic peening, and laser surface peening. Peening is directed at imparting stress to a surface (e.g., metal or alloy) to pre-condition the surface against wear and stresses that are encountered throughout the component's life span.

For example, laser surface peening has been used to increase the resistance of aircraft gas turbine engine compressor and fan blades to damage and increase their useful life (e.g., via preventing or reducing high cycle fatigue). Laser surface peening, as with other peening processes or treatments, creates residual compressive stresses in component surfaces.

Laser surface peening is therefore used to provide compressive stress to the surface of a component (e.g., aircraft engine fan blade) to prevent the formation of fatigue cracks in the surface of the component and to reduce the propagation of such fatigue cracks once formed. Laser surface peening drives a high-energy (amplitude) shock wave into a component surface using a pulsed laser. The laser heats an overlay material (e.g., underlying opaque material and upper transparent material) such that the opaque overlay material absorbs the energy from the laser pulse and produces a shock wave, directed downward into the part surface (assisted, e.g., via the upper transparent layer of the overlay material). Laser surface peening therefore provides a mechanical stress (in turn brought about by the shock wave rather than a thermal treatment from heat generated by the laser at the surface).

Laser surface peening has been employed to impart residual compressive stresses of up to about 1 mm in depth. Laser surface peening has been particularly effective in aircraft engine titanium alloy fan and compressor blade applications and other small-scale (thin component) applications.

BRIEF SUMMARY

One embodiment provides a method, comprising: applying an overlay material to a portion of a rotatable shaft; directing a pulse of laser energy to contact the overlay material to produce a shock wave; and re-positioning one or more of the portion of the rotatable shaft and the pulse of laser energy to contact the overlay material at different positions to create a laser peened surface on the portion of the rotatable shaft; the pulse of laser energy comprising a pulse sufficient to create the laser peened surface having residual compressive stress to a depth exceeding about 3 mm.

Another embodiment provides a rotatable shaft, comprising: a rotatable shaft portion deep laser peened to produce a laser peened surface having residual compressive stress to a depth of about 3 mm or more.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
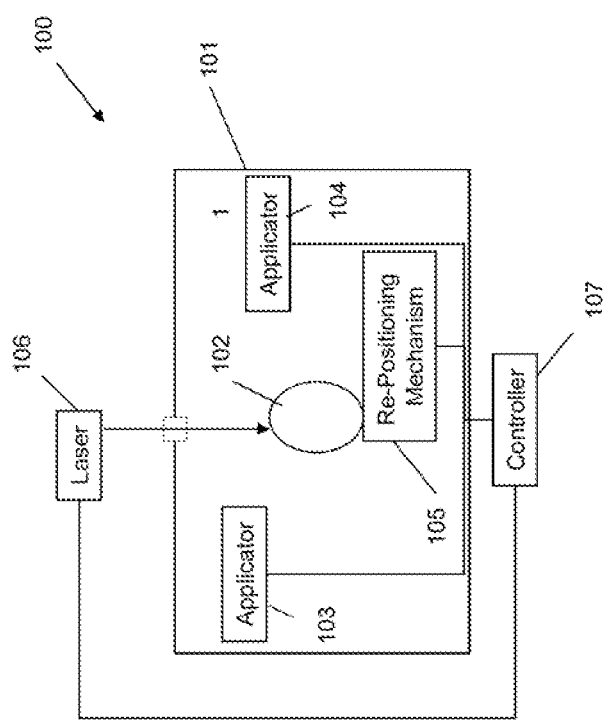
FIG. 1 illustrates an example deep laser peening system.

It will be readily understood that the details of the example embodiments, as generally described and illustrated in the figures herein, may be arranged and designed in a wide variety of different ways in addition to the described example embodiments. Thus, the following more detailed description of the example embodiments is not intended to limit the scope of the claims, but is merely representative of certain example embodiments.

Reference throughout this specification to "embodiment(s)" (or the like) means that a particular feature, component, step or characteristic described in connection with the embodiment is included in at least one embodiment. Thus, appearances of the phrases "according to embodiments" or "an embodiment" (or the like) in various places throughout this specification are not necessarily all referring to the same example embodiment.

Furthermore, the described features, components, steps, or characteristics may be combined in any suitable manner in different embodiments. In the following description, numerous specific details are provided to give a thorough understanding of certain example embodiments. One skilled in the relevant art will recognize, however, that aspects can be practiced without certain specific details, or with other methods, components, materials, et cetera. In other instances, well-known structures, materials, components, steps or operations are not shown or described in detail to avoid obfuscation.

Conventionally, laser surface peening has been utilized to treat surfaces of relatively small/thin components, as the treatment is only known to provide compressive stress (residual compressive stress) to a depth of approximately 1 mm. This is quite suitable for small-scale applications involving thin components, e.g., aircraft parts such as fan blades or other such components requiring surface peening.

Laser surface peening has not been applied for larger-scale applications, e.g., rotatable shafts such as crankshafts for larger engines such as diesel locomotive engines, diesel ship engines, etc., power generator shafts for power generation or transfer applications, propellers of ships, windmill shafts, and the like. Rather, laser surface peening has only been applied to components where depth of residual compressive residual stress was not at issue.

Typically more conventional treatments (e.g., shot peening or pneumatic peening) have been utilized in large-scale applications in order to ensure residual compressive stress is provided at sufficient depths (e.g., in excess of 1 mm known for laser surface peening). Deeper residual compressive stress is desired for such larger-scale applications for a variety of reasons. For example, in larger-scale applications (e.g., locomotive engine crankshafts or like components) larger stresses are encountered, longer in-service times are used, and such components often need resurfacing (i.e., machining to remove a surface layer) during their life cycle. Therefore, application of a laser surface peening treatment would not seem generally useful in such large-scale applications.

An embodiment leverages the realization that laser peening may be applied using a high-energy laser pulse to provide deep laser peening. The deep laser peening provides residual compressive stress to components such as locomotive crankshafts at depths exceeding 3 mm. Given that greatly increased depths of residual compressive stress are achievable using laser peening than heretofore realized, laser peening is a viable alternative to more costly and labor intensive peening techniques (e.g., shot peening or pneumatic peening or induction case hardening techniques) that provide residual compressive stress to an adequate depth for large-scale applications. Deep laser peening (i.e., to a depth of 3 mm or more than 3 mm) is a desirable, cost-effective alternative to other peening techniques conventionally utilized for large-scale applications such as locomotive crankshafts.

Accordingly, an embodiment provides a method including applying an overlay material to a portion of a rotatable shaft such as a crankshaft; directing a pulse of laser energy to contact the overlay material to produce a shock wave; and re-positioning one or more of the portion of the rotatable shaft and the pulse of laser energy to contact the overlay material at different positions to create a laser peened surface on the portion of the rotatable shaft; the pulse of laser energy comprising a pulse sufficient to create the laser peened surface having residual compressive stress to a depth exceeding about 3 mm.

An embodiment provides a method wherein the portion of the crankshaft comprises a crankshaft fillet. The portion of the crankshaft may comprise two or more crankshaft fillets joined together, with laser peening applied at a joint or transition portion there-between. The rotatable shaft may be a crankshaft, such as that of a large diesel engine, for example a locomotive engine or a ship engine. The laser pulse may be used to provide a laser peened surface where two or more components, e.g., crankshaft fillets, are joined together.

An embodiment provides a method wherein the pulse of laser energy comprises a pulse sufficient to create the laser peened surface having residual compressive stress to a depth exceeding about 4 mm, or to a depth exceeding about 5 mm, or to a depth exceeding about 6 mm, or to a depth exceeding about 7 mm.

An embodiment therefore also provides a rotatable shaft such as a crankshaft comprising a rotatable shaft having a laser peened surface having residual compressive stress to a depth of about 3 mm or more.

Re-application of peening following re-surfacing is no longer required because deep laser peening provides residual compressive stress to a sufficient depth. Therefore, a surface layer of material (e.g., 1 mm or more) may be removed during servicing of a component such as a crankshaft while retaining a sufficient amount of the peened surface.

An embodiment therefor also provides a method comprising re-surfacing a rotatable shaft such as a crankshaft having had a laser peening treatment applied to at least a portion of the rotatable shaft to produce a laser peened surface having a residual compressive stress exceeding a depth of about 3 mm; the re-surfacing comprising removing a layer from at least a portion of the laser peened surface; and providing the rotatable shaft for use in a motor or power generation or power transfer application without applying an additional peening treatment. The layer removed from the surface may be 1 mm or more. The method may include removal and re-surfacing of crankshafts or like components having had a laser peening treatment applied giving a residual compressive stress depth up to about 7 mm or more without the need to re-apply the laser peening treatment, or other peening treatment, owing to the depth of the original deep laser peening treatment.

Laser peening processing of the damage prone areas on a large rotatable shaft component such as a crankshaft fillet is an excellent candidate technology to provide deep residual compressive stress. Laser peening has been capable of imparting deep residual compressive stresses up to 1 mm deep into the treated surface. However, embodiments utilize laser peening to exceed this depth of treatment. Accordingly, embodiments provide deep laser peening treatment or processing.

The deep laser peening process may be applied to the surface to be processed in order to produce a shock wave that will propagate into the surface. The deep laser peening may utilize an overlay material having two layers (i.e., a transparent layer such as water and an energy absorbing layer or opaque layer). During processing, a laser beam is directed to pass through the transparent layer and is absorbed by the opaque layer causing a rapid vaporization of the opaque layer and generating a high-amplitude shock wave. The shock wave cold works the surface, e.g., of the crankshaft, being treated and creates residual compressive stresses. The residual compressive stresses in turn provide beneficial fatigue properties for the crankshaft. A crankshaft or portion thereof may be processed in a typical fashion such that overlapping areas are treated to cover the desired area of the crankshaft (or portion thereof). A typical layer of overlay material is about 10 to 20,000 micrometers thick.

Referring now to the figures and particularly to FIG. 1, there is illustrated an example system 100 for applying a deep laser peening treatment to a component such as a crankshaft 102. The system 100 may include a chamber 101 in which the process occurs. The chamber 101 may include an opening for a laser beam created by a laser 106 (e.g., a neodymium-glass laser) disposed external to the chamber 101. Laser 106, by way of example, may be a commercially available high power pulse laser system capable of delivering appropriate energy for the desired depth of residual compressive stress, e.g., a laser delivering more than approximately 40 joules in 5 to 100 nanoseconds. The laser pulse length and focus of the laser beam may be adjusted as known in the art.

Illustrated in FIG. 1 is a crankshaft 102 that may be held in different positions within chamber 101 by a positioning mechanism 105. The positioning mechanism 105 may include a robotic control (e.g., via an arm or other assembly) to precisely position and re-position the crankshaft 102 relative to the laser beam.

The system 100 may include overlay material applicators 103, 104 for applying an energy absorbing layer of opaque material and a transparent layer of overlay material onto the crankshaft 102. Suitable overlay materials and material applicators are known and commercially available.

The system 100 may further include a controller 107 operatively coupled to other system components to be controlled. The controller 107 may control the system 100 in terms of operation and timing. The controller 107, in one embodiment, may be a programmed information handling device, such as a desktop, laptop or other computing device having a processor and a memory storing instructions executable by the processor. The instructions may include program instructions that, when executed by the processor, cause the controller 107 to perform system management functions, as described herein. The instructions may be stored on a non-signal storage medium (program product), such as a memory device of an information handling device. The program product may include an article of manufacture storing the instructions for execution by a processor to perform acts commensurate with the actions of the controller 107 or other embodiments or portions of embodiments described herein.

Figure 2:
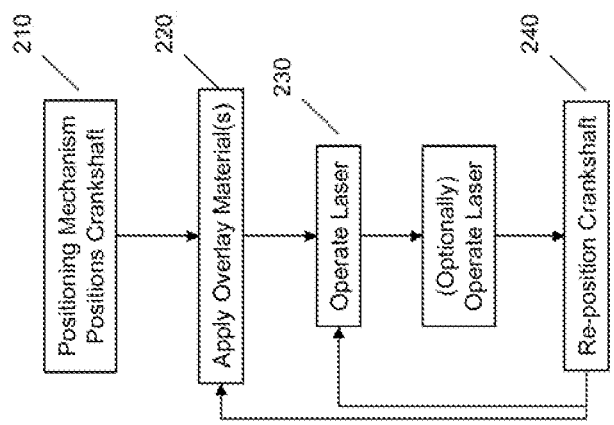
FIG. 2 illustrates an example method of deep laser peening.

In operation, referring to FIG. 2, the controller 107 controls operation of system 100. As shown in FIG. 2, an example method includes placing the crankshaft 102 in the chamber 101, e.g., by positioning mechanism 105 at 210. The controller 107 activates material applicators 103, 104 to apply appropriate overlay materials onto a particular location of the crankshaft 102 to be processed at 220. The controller 107 operates the laser 106 to initiate the laser beam 16 to impact the coated portion of the crankshaft 102 at 230. This pulse of the laser creates a shock wave, and as the plasma expands from the impact area a shock wave is applied to the crankshaft 102. This may be repeated to shock the crankshaft 102 as desired to achieve deep laser peening. Depending on the energy levels and the amount of laser shocking, controller 107 may re-position the crankshaft 102 so that the system 100 may impact a different portion (that may overlap the previously impacted area) at 240. This process may be repeated to create the deep laser peened surface on the crankshaft.

Depending upon the crankshaft material, the laser, and/or the overlay material(s) utilized, many parameters may be selected to control the process. For example, a particular laser pulse energy, laser pulse time, number of laser pulses, focal lens, working distance, thickness of both the energy absorbing coating and transparent overlay, or a combination of the foregoing, may be modified to control the process to achieve deep laser peening. More particularly, laser pulse energy and laser pulse width may directly affect this cycle. The amount of energy placed on the surface of the crankshaft and number of laser pulses affects the depth of each shock and the speed of the shocking process. In a crankshaft application, it may not be necessary to closely control the energy of the laser pulse (as well as other parameters) to prevent surface artifacts, as with other applications. In other words, in large-scale applications where deep laser peening is desired, surface disruption is a secondary concern relative to achieving a deep level of residual compressive stress, e.g., in excess of 3 mm.

Figure 3:
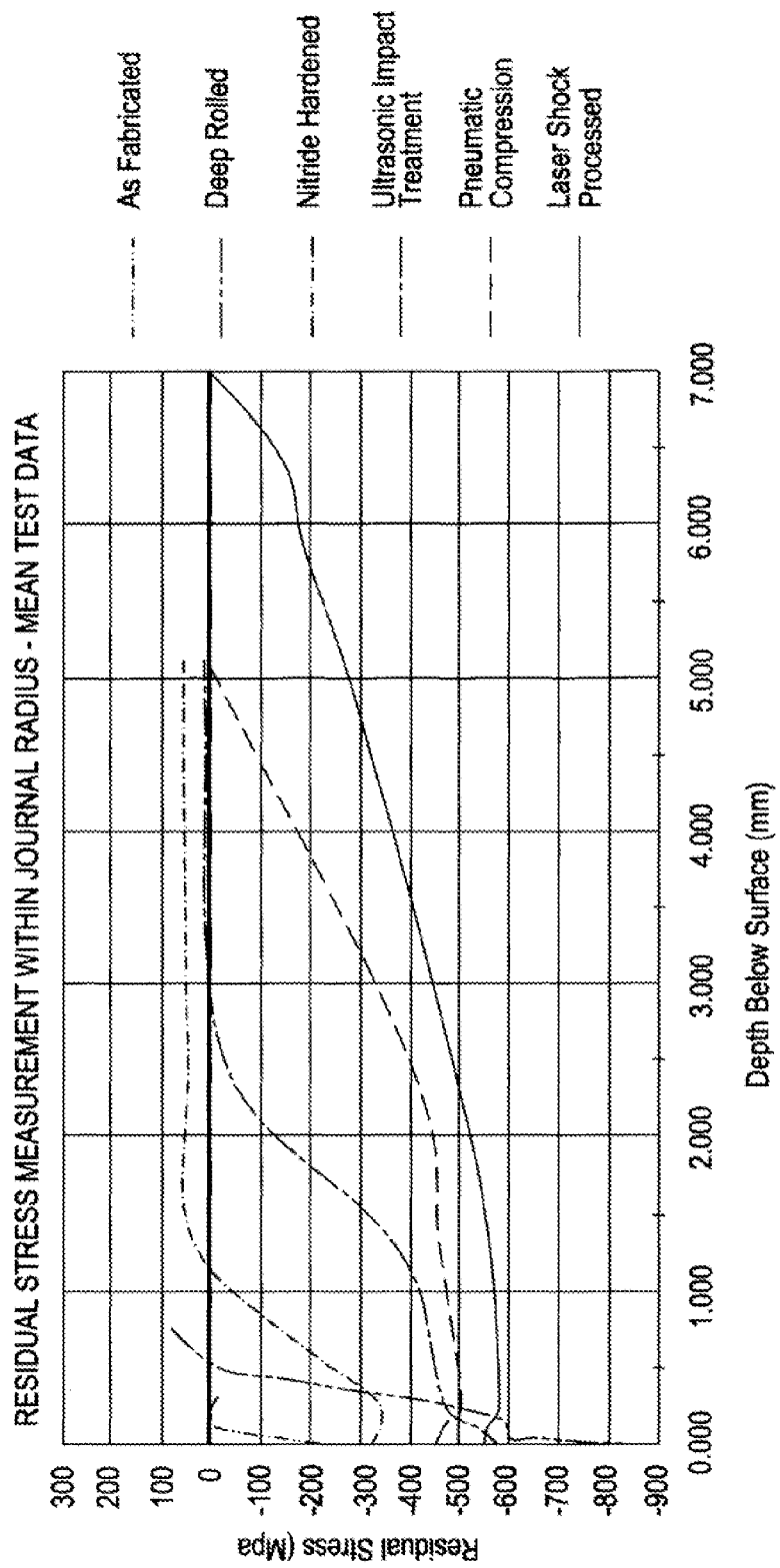
FIG. 3 illustrates example residual compressive stress imparted by peening treatments.

FIG. 3 illustrates some example peening treatments. As illustrated in FIG. 3, an embodiment provides deep laser peening treatment. The deep laser peening treatment is effective at providing residual compressive stress to depths exceeding 7 mm. The depth of the residual compressive stress may vary, e.g., depending on laser pulse energy parameters, overlay materials, and the like, as described herein. Embodiments therefore provide deep laser peening treatments that in turn impart residual compressive stress far deeper than conventional peening treatments such as ultrasonic and pneumatic peening, deep rolling, or chemical treatments such as nitride hardening. The example peening process comparisons of FIG. 3 are summarized in Table 1.

TABLE 1

Comparison of Peening Processes

| Peening Process | Residual Compressive Stress Depth |
|---|---|
| Mill Turned (as-fabricated) | 0.1 mm |
| Surface Deep Roll | 0.5 mm |
| Nitride Case Hardening | 1.2 mm |
| Ultrasonic Impact Treatment | 3.0 mm |
| Pneumatic Compression | 5.0 mm |
| Deep Laser Peening | 7.0 mm |
| Induction Case Hardening | 7.0 mm |

Figure 4:
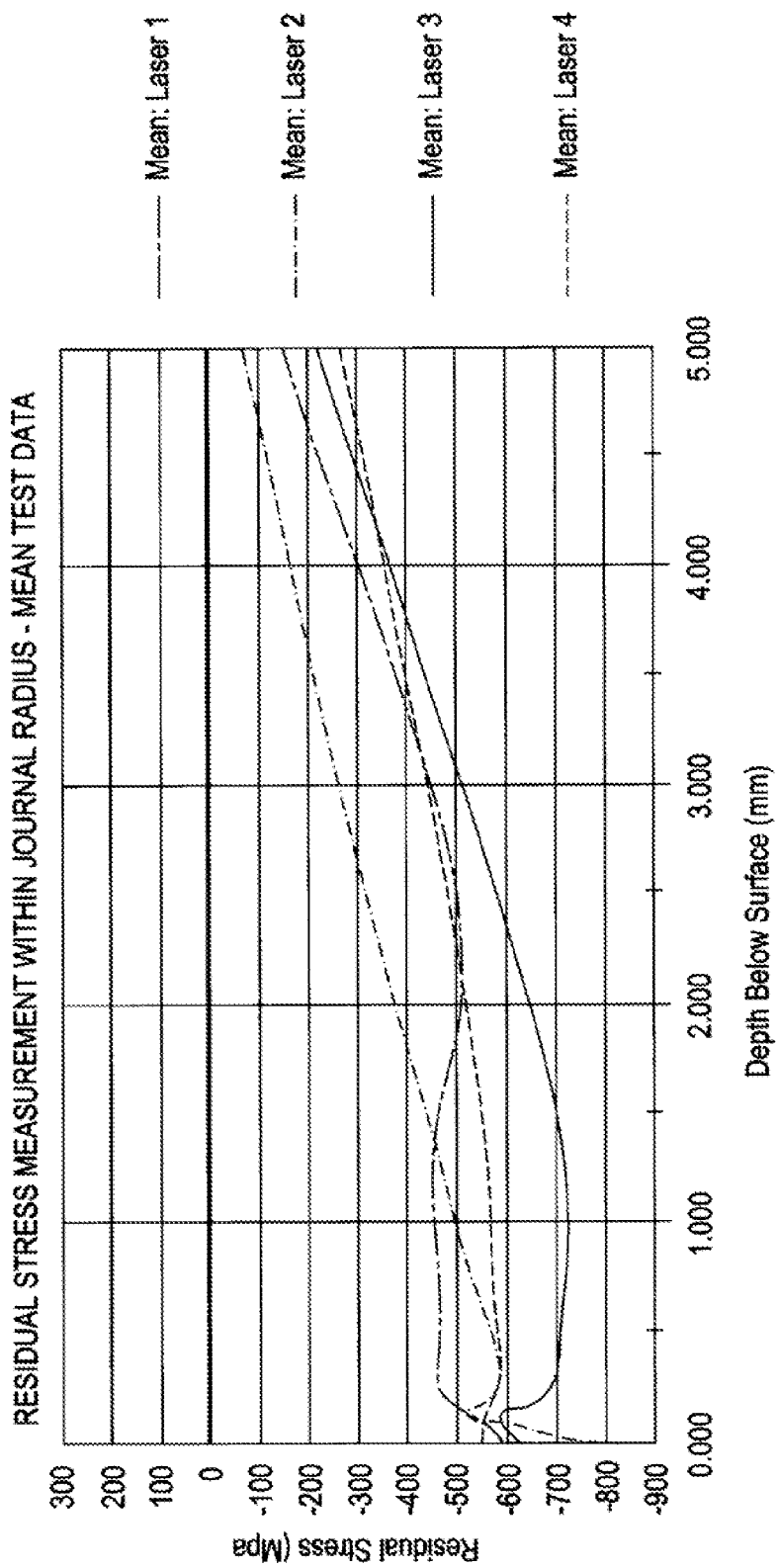
FIG. 4 illustrates example residual compressive stresses imparted by example deep laser peening treatments.

In FIG. 4 it may be appreciated that various laser settings may produce varying levels of residual compressive stress (i.e., at varying depths). As illustrated in FIG. 4, there are a variety of laser settings that may be utilized to achieve adequate deep laser peening for large-scale applications. The examples illustrated in FIG. 4 were obtained by variation of operational parameters, including laser energy, laser timing, and laser positioning to achieve deep laser peening (i.e., maximum depth or increased depth settings). Deep laser peening, such as illustrated in FIG. 4, may be obtained from a vendor of material surface improvement technologies that utilizes laser shock processing or laser surface peening. In the figures, the residual compressive stress depth was measured using X-ray diffraction, as is known in the art.

Embodiments therefore provide for deep laser peening. The deep laser peening provides residual compressive stress at depths exceeding 7 mm, comparable with induction case hardening. The deep laser peening, as provided according to example embodiments described herein, is useful as an alternative to conventional peening techniques and treatments used in large-scale applications, such as crankshafts used in large diesel engines.

In an embodiment, a component such as a crankshaft, having undergone deep laser peening according to the example embodiments, may be resurfaced without requiring additional peening. Therefore, on removal of a component such as a crankshaft and resurfacing it (e.g., removing a layer of peened surface via machining), the component need not undergo additional peening prior to re-use. Therefore, the component may be provided, e.g., for re-installation into an engine, without peening the surface, as the component will retain residual compressive stress to a sufficient depth.

It will be appreciated that deep laser peening may be employed in a variety of implementations where large scale-components require residual compressive stress deep within the component (e.g., on the order of in excess of 3 mm). Examples dealing with crankshafts have been given herein, however, the principles disclosed herein may be employed to other rotatable shafts or large-scale components, including but not limited to power generation or transfer rotatable shafts, ship propellers, windmill shafts, and the like. Such applications will benefit from deep laser peening treatments imparting residual compressive stresses deep within the components.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the specification there has been set forth example embodiments and, although specific terms are used, the description thus given uses terminology in a generic and descriptive sense only and not for purposes of limitation.

Finally, any numerical parameters set forth in the specification and claim(s) are approximations (for example, by using the term "about") that may vary depending upon the desired properties sought to be obtained by the embodiment(s). At the very least, each numerical parameter should at least be construed in light of the number of significant digits and by applying ordinary rounding.

What is claimed is:

1. A method, comprising:
   applying an overlay material to a portion of a rotatable shaft;
   directing a pulse of laser energy to contact the overlay material to produce a shock wave; and
   re-positioning one or more of the portion of the rotatable shaft and the pulse of laser energy to contact the overlay material at different positions to create a laser peened surface on the portion of the rotatable shaft;
   the pulse of laser energy comprising a pulse sufficient to create the laser peened surface having residual compressive stress to a depth exceeding about 3 mm.

2. The method of claim 1, wherein the rotatable shaft comprises a crankshaft and further wherein the portion of the rotatable shaft comprises a crank shaft fillet.

3. The method of claim 2, wherein the portion of the rotatable shaft comprises two or more crankshaft fillets joined together.

4. The method of claim 1, wherein the pulse of laser energy comprises a pulse sufficient to create the laser peened surface having residual compressive stress to a depth exceeding about 4 mm.

5. The method of claim 1, wherein the pulse of laser energy comprises a pulse sufficient to create the laser peened surface having residual compressive stress to a depth exceeding about 5 mm.

6. The method of claim 1, wherein the pulse of laser energy comprises a pulse sufficient to create the laser peened surface having residual compressive stress to a depth exceeding about 6 mm.

7. The method of claim 1, wherein the pulse of laser energy comprises a pulse sufficient to create the laser peened surface having residual compressive stress to a depth exceeding about 7 mm.

8. A rotatable shaft, comprising:
   a rotatable shaft portion deep laser peened to produce a laser peened surface having residual compressive stress to a depth of about 3 mm or more.

9. The rotatable shaft of claim 8, wherein the rotatable shaft comprises a crankshaft and the laser peened surface comprises a crank shaft fillet.

10. The rotatable shaft of claim 9, wherein the laser peened surface comprises a joint area of two or more crankshaft fillets.

11. The rotatable shaft of claim 8, wherein the laser peened surface has residual compressive stress to a depth exceeding about 4 mm.

12. The rotatable shaft of claim 8, wherein the laser peened surface has residual compressive stress to a depth exceeding about 5 mm.

13. The rotatable shaft of claim 8, wherein the laser peened surface has residual compressive stress to a depth exceeding about 6 mm.

14. The rotatable shaft of claim 8, wherein the laser peened surface has residual compressive stress to a depth exceeding about 7 mm.

* * * * *